No. 843,344. PATENTED FEB. 5, 1907.
F. M. LINDERMAN.
BELT SPLICING IMPLEMENT.
APPLICATION FILED AUG. 16, 1906.
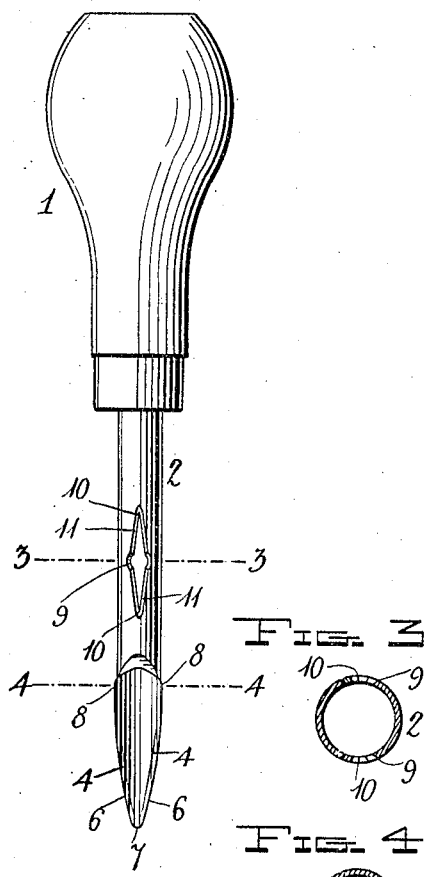
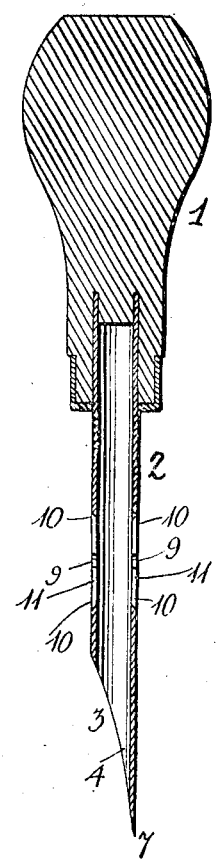
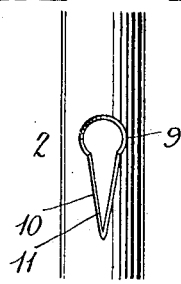
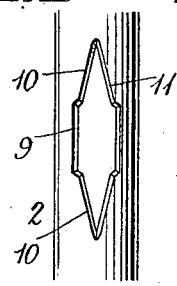
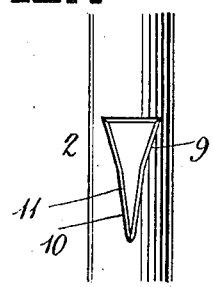
Inventor.
F. M. Linderman
by H. B. Willson &co
Attorneys
Witnesses

UNITED STATES PATENT OFFICE.

FRANK M. LINDERMAN, OF CHICAGO, ILLINOIS.

BELT-SPLICING IMPLEMENT.

No. 843,344.  Specification of Letters Patent.  Patented Feb. 5, 1907.

Application filed August 16, 1906. Serial No. 330,810.

*To all whom it may concern:*

Be it known that I, FRANK M. LINDERMAN, a citizen of the United States, residing at Chicago, in the county of Cook and State of Illinois, have invented certain new and useful Improvements in Belt-Splicing Implements; and I do declare the following to be a full, clear, and exact description of the invention, such as will enable others skilled in the art to which it appertains to make and use the same.

This invention relates to improvements in belt-splicing implements, and consists in the novel construction, combination, and arrangement of devices hereinafter described and claimed.

The object of the invention is to improve and simplify the construction and operation of implements of this character, and thereby render the same more efficient for the purposes intended.

The above and other objects, which will appear as the nature of the invention is better understood, are accomplished by the construction illustrated in the accompanying drawings, in which—

Figure 1 is a front elevation of the improved tool or implement. Fig. 2 is a longitudinal sectional view thereof. Figs. 3 and 4 are transverse sectional views taken, respectively, on the planes indicated by the lines 3 3 and 4 4 in Fig. 1; and Figs. 5, 6, and 7 are front elevations of the tubular portions of the tools or implements, showing different forms of eyes which may be used instead of the eye shown in Fig. 1.

The improved tool or implement consists of a handle 1 and a tubular tool-body 2, which latter may be fixed against rotation in the handle in any suitable manner. The body 2 is preferably formed from a solid tube of tool-steel, and its end is shaped to provide a rotary cutter or awl. This is preferably done by beveling one side of the end of the body, as shown at 3, and then sharpening the inner edges of the beveled portion, as at 4, to provide sharp cutting edges 6. The latter have a slight longitudinal curvature, so that the bevel on the end of the tool is somewhat concaved when viewed in side elevation and they converge to a rounded cutting point 7. The diverging inner ends of the cutting edges 6 are flared outwardly to a slight extent, as shown at 8, so that this cutting end of the tool is somewhat broader than the tubular body 2. Formed at diametrically opposite points in the tubular body 2 are eyes 9, which have wedge-shaped ends 10, the converging edges of which are slightly beveled, as shown at 11, so that these edges are somewhat sharp. These transversely-alining eyes preferably extend longitudinally and have the wedge-shaped portions at each end, as shown in Figs. 1 and 6; but, if desired, they may be made as shown in Figs. 5 and 7, in which the tapering or wedge-shaped portion 10 extends from but one side or end of the opening 9. In other words, the openings 9 may be circular, rectangular, or of other form, and one or more of the V-shaped or wedge-shaped portions 10 may open into them.

In using the tool for cutting a hole in a belt or other article the point is inserted and the tool rotated so that its side cutting edges will cut the leather. By inserting the tool to a greater or less extent it will be readily seen that the diameter or size of the hole made may be regulated as desired. The cutting edges also enable any trimming or cutting that may be necessary or desirable to be readily done. When the tool is used for drawing the lacing thong or cord through the holes in the belt, the end of the thong is inserted in the alining eyes 9 and the tool is shifted longitudinally, so that the thong is wedged in the V-shaped or wedge-shaped portions 10 of said eyes, the tool thus securing an effective purchase or grip upon the lacing thong or cord to permit the latter to be readily pulled through the belt. The beveled edges 11 of the portions 10 of the openings or eyes cause the device to more effectively grip the lacing thong or cord without regard to the length of the end or portion of the thong or cord projecting through the hole in the belt. There is very little danger of the end of the thong or cord slipping out of the V-shaped portion 10 when once wedged in the same, and owing to the fact that the eyes 9 are alined the cord or thong may be readily inserted and engaged. Owing to this V-shaped end of the eye the end of the cord or thong when projecting only to a slight extent through the belt can be readily caught by the tool and then twisted upon the same, so that the tool acts as a drum and draws the thong or cord through the belt without the aid of a pair of pliers or any similar device.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. An implement of the class described comprising a handle and a tubular tool portion having its outer extremity sharpened to provide a cutter and provided in its opposite sides with transversely-alining eyes provided with cord-holding means.

2. An implement of the class described comprising a handle and a tubular tool portion having its outer extremity sharpened to provide a cutter, and having in its opposite sides or faces eyes provided with V-shaped or wedge-shaped portions, substantially as shown and for the purpose set forth.

3. An implement of the class described comprising a handle and a tubular tool portion having its outer extremity sharpened to provide a cutter, and having transversely-alining V-shaped or wedge-shaped eyes in its opposite sides or faces, substantially as shown and for the purpose set forth.

4. An implement of the class described comprising a handle and a tubular tool portion having its outer extremity sharpened to provide a cutter, and having in its opposite sides or faces transversely-alining eyes provided with V-shaped portions having beveled edges, substantially as shown and for the purpose set forth.

5. An implement of the class described comprising a handle portion and a tubular tool portion, the tool portion having its free end beveled off to form tapering side cutting edges and a cutting-point, the said cutting edges having their diverging inner ends flared outwardly to provide a cutter of greater diameter than the tubular body portion of the tool, said tool portion also having intermediate its ends transversely-alining eyes formed in its opposite sides or faces and provided with V-shaped or wedge-shaped portions having beveled edges, substantially as shown and for the purpose set forth.

In testimony whereof I have hereunto set my hand in presence of two subscribing witnesses.

FRANK M. LINDERMAN.

Witnesses:
  MURDOCH M. MACLEOD,
  CHAS. A. BING.